United States Patent [19]

Ohmura

[11] Patent Number: 5,027,917
[45] Date of Patent: Jul. 2, 1991

[54] POWER-STEERING SYSTEM
[75] Inventor: Hiroshi Ohmura, Hiroshima, Japan
[73] Assignee: Mazda Motor Corporation, Hiroshima, Japan
[21] Appl. No.: 558,503
[22] Filed: Jul. 27, 1990
[30] Foreign Application Priority Data Jul. 28, 1989 [JP] Japan .................................. 1-196276

[51] Int. Cl.$^5$ ........................... B62D 5/06; B62D 6/00
[52] U.S. Cl. .................................... 180/142; 180/143; 364/424.05
[58] Field of Search ............... 180/142, 143, 132, 74.1; 364/424.05

[56] References Cited

U.S. PATENT DOCUMENTS 4,712,631 12/1987 Kervagoret ......................... 180/143

FOREIGN PATENT DOCUMENTS 61-92964 5/1986 Japan .
61-163777 10/1986 Japan .
62-44772 3/1987 Japan .

Primary Examiner—Charles A. Marmor
Assistant Examiner—P. Dickson
Attorney, Agent, or Firm—Sixbey, Friedman, Leedom & Ferguson

[57] ABSTRACT

A power-steering system for a vehicle includes a steering wheel which turns the front wheels, a power cylinder device which assists the steering wheel in turning the front wheels, a vehicle speed sensor which detects the vehicle speed, and a control unit which controls the power cylinder device so that the assisting force with which the power cylinder device assists the steering wheel is reduced with increase in the vehicle speed. The control unit has a reverse gear sensor which detects when the transmission of the vehicle is in reverse, and reduces the assisting force with increase in the vehicle speed at a higher rate when the vehicle runs rearward than when the vehicle runs forward.

7 Claims, 4 Drawing Sheets

F I G.1
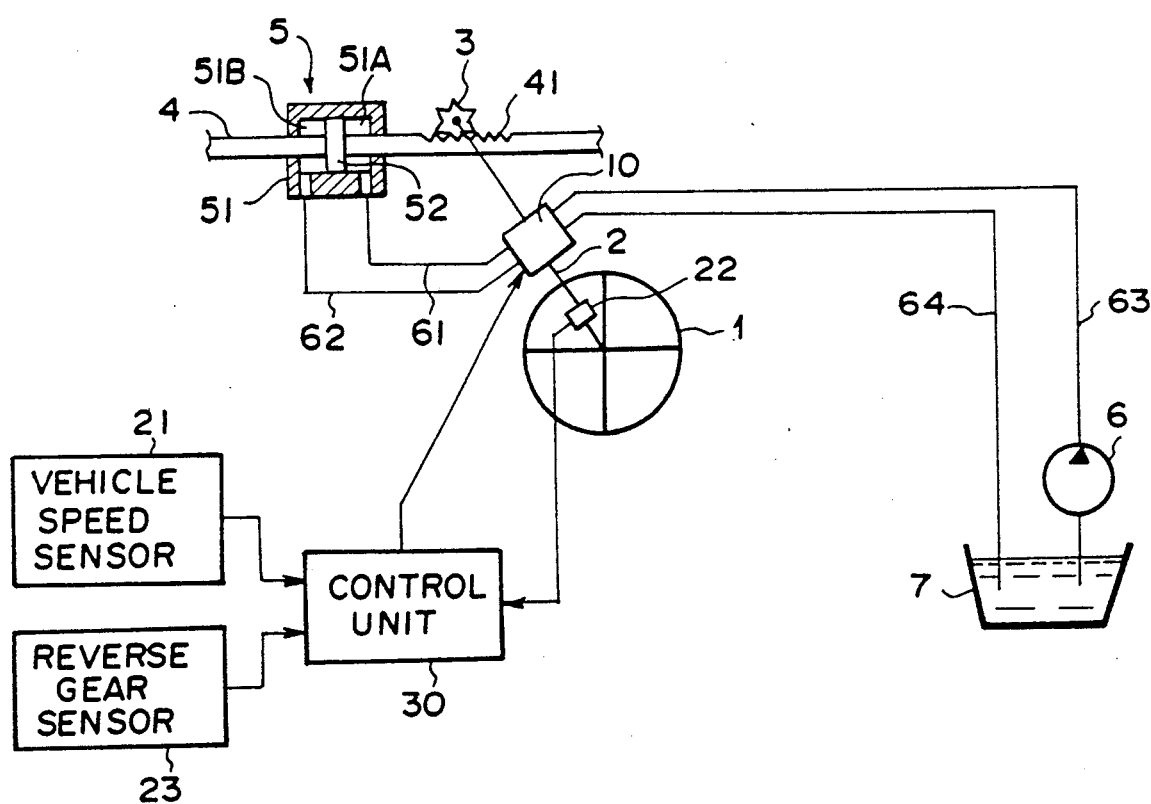

F I G. 3
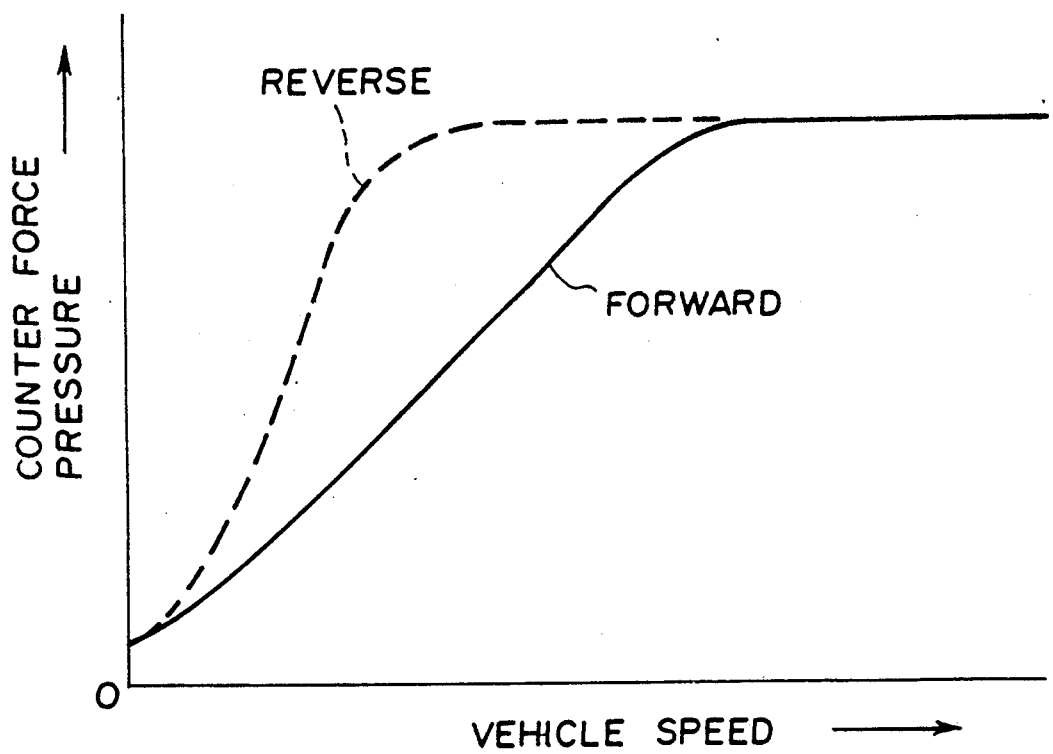

POWER-STEERING SYSTEM

BACKGROUND OF THE INVENTION

1. Field of the Invention

This invention relates to a power-steering system for a vehicle.

2. Description of the Prior Art

There has been known a power-steering system for a vehicle in which the assisting force is reduced with increase in the vehicle speed so that when the vehicle speed is low or zero, the steering wheel can be easily turned, and when the vehicle speed is high, immoderate turn of the steering wheel is prevented.

Generally, the normal vehicle in which the front wheels are dirigible is apt to yaw and loose running stability when it runs rearward unlike when it runs forward. In this conjunction, the conventional power-steering system in which the rate of reducing the assisting force with increase in the vehicle speed is the same irrespective of whether the vehicle is driven in reverse or forward is disadvantageous in that it does not contribute to suppressing occurrence of yaw of the vehicle body when the vehicle runs rearward.

SUMMARY OF THE INVENTION

In view of the foregoing observations and description, the primary object of the present invention is to provide a power-steering system which can effectively suppress occurrence of yaw of the vehicle body when the vehicle runs rearward.

In accordance with the present invention, there is provided a power-steering system for a vehicle comprising a steering wheel which turns the front wheels, a power assisting means which assists the steering wheel in turning the front wheels, a vehicle speed sensor which detects the vehicle speed, and a control means which controls the power assisting means so that the assisting force with which the power assisting means assists the steering wheel is reduced with increase in the vehicle speed, characterized in that said control means has a reverse detecting means which detects that the vehicle runs rearward, and reduces the assisting force with increase in the vehicle speed at a higher rate when the vehicle runs rearward than when the vehicle runs forward.

With this arrangement, the steering wheel becomes heavier when the vehicle runs rearward at a given speed than when it runs forward at the given speed and accordingly, the vehicle becomes less apt to yaw.

BRIEF DESCRIPTION OF THE DRAWINGS

FIG. 1 is a schematic view showing an example of a power-steering system to which the present invention is applied, FIG. 3 is a view showing the counterforce pressure-vehicle speed control characteristics according to which the control unit of the power-steering system in accordance with an embodiment of the present invention controls the counterforce pressure.

DESCRIPTION OF THE PREFERRED EMBODIMENT

Figure 2:
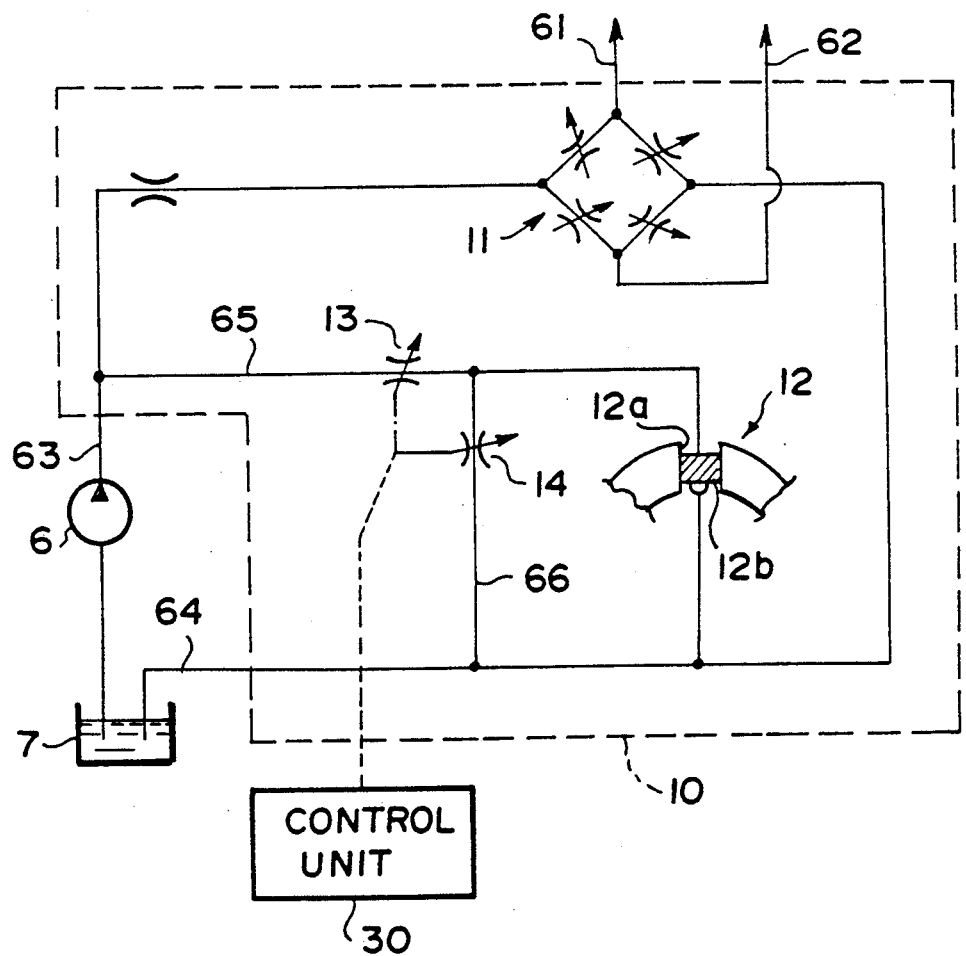
FIG. 2 is a schematic view showing an example of the control valve of the power-steering system.

In FIGS. 1 and 2, a pinion 3 is formed on the lower end of a steering shaft 2 which is connected to a steering wheel 1. The pinion 3 is in mesh with a rack 41 formed on a relay rod 4, and the relay rod 4 is turned in the transverse direction of the vehicle body in response to turning of the steering wheel 1, thereby turning the front wheels (not shown) by way of tie rods and knuckle arms.

A cylinder device 5 is mounted on the relay rod 4. The cylinder device 5 comprises a cylinder body 51 which is fixed to the vehicle body and a piston 52 which is formed integrally with the relay rod 4 and divides the space in the cylinder body 51 into two chambers 51A and 51B.

The chambers 51A and 51B communicate with a rotary type control valve 10 respectively by way of hydraulic lines 61 and 62. The control valve 10 is mounted on the steering shaft 2. T To the control valve 10 are connected an oil supply line 63 which is connected to the discharge port of an oil pump 6 and an oil discharge line 64 which is connected to a reservoir 7.

As shown in detail in FIG. 2, the control valve 10 comprises a switching valve 11 and a counterforce mechanism 12.

The switching valve 11 supplies hydraulic pressure to one of the chambers 51A and 51B according to the turning direction of the steering wheel 1.

The counterforce mechanism 12 comprises a counterforce chamber 12a communicating with a branch line 65 which branches off from the oil supply line 63, and a piston 12b which receives the pressure in the counterforce chamber 12a. The counterforce mechanism 12 increases the force required to turn the steering wheel 1 as the pressure in the counterforce chamber 12a increases, that is, increases the force for restraining a torsion bar connected to the steering wheel 1, thereby weakening the assisting force. A branch line 66 further branches off from the branch line 65 and communicates with the oil discharge line 64. A pair of variable constrictions 13 and 14 which are interlocked with each other are provided respectively in the branch line 65 upstream of the junction of the branch line 66 to the branch line 65 and in the branch line 66.

The variable constrictions 13 and 14 are interlocked with each other so that when the opening of one of them increases, the opening of the other decreases. As the opening of the constriction 13 in the branch line 65 increases from 0 and the opening of the constriction 14 in the branch line 66 decreases from the maximum, the pressure in the counterforce chamber 12a (the counterforce pressure) increases and the assisting force is weakened (i.e., the steering wheel becomes heavy).

The variable constrictions 13 and 14 are controlled by a control unit 30 having a CPU.

The control unit 30 receives signals from a vehicle speed sensor 21 which detects the vehicle speed, a steering angle sensor 22 provided on the steering shaft 2 and a reverse gear sensor 23 which detects that the transmission is in reverse, and controls the variable constrictions 13 and 14 according to a predetermined control program on the basis of the signals. The structures shown in FIGS. 1 and 2 are known per se. For example, see U.S. Pat. Nos. 3,099,167; 4,034,825; 3,44,127 and 4,434,866.

In one embodiment of the present invention, the control unit 30 controls the variable constrictions 13 and 14 according to the vehicle speed so that the counterforce pressure changes with the vehicle speed in the manner shown by the solid line in FIG. 3 when the vehicle runs forward, i.e., when the reverse gear sensor 23 outputs no signal and in the manner shown by the broken line in FIG. 3 when the vehicle runs rearward. Accordingly, when the vehicle runs rearward, the steering wheel becomes heavy at a lower speed than when the vehicle runs forward, whereby the position of the steering wheel is stabilized and occurrence of yaw is suppressed when the vehicle runs rearward.

Figure 4:
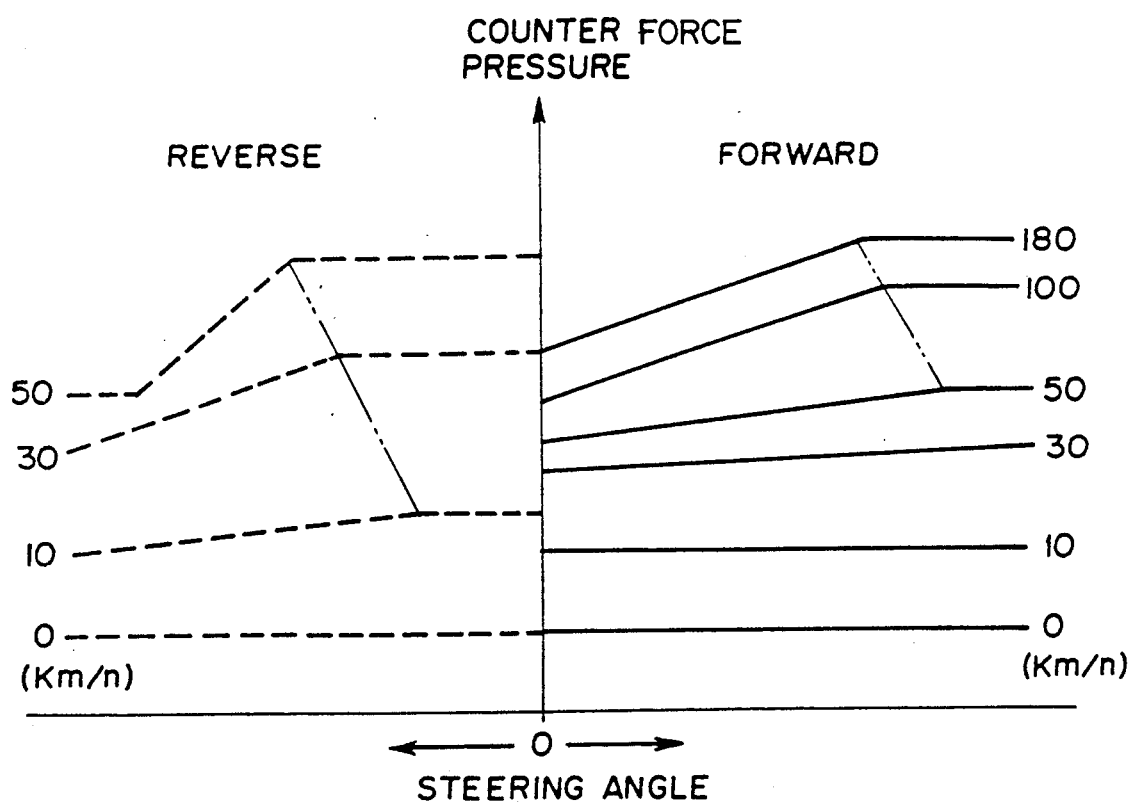
FIG. 4 is a view showing the control characteristics according to which the control unit of the power-steering system in accordance with another embodiment of the present invention controls the counterforce pressure.

In another embodiment of the present invention, the control unit 30 controls the variable constrictions 13 and 14 according to both the vehicle speed and the steering angle so that the counterforce pressure changes with the vehicle speed and the steering angle in the manner shown by the solid line in FIG. 4 when the vehicle runs forward and in the manner shown by the broken line in FIG. 4 when the vehicle runs rearward.

That is, when the vehicle runs forward, the counterforce pressure is increased with increase in the vehicle speed and the counterforce pressure at a given vehicle speed is increased with increase in the steering angle. On the other hand, when the vehicle runs rearward, the counterforce pressure is increased with increase in the vehicle speed at a rate larger than when the vehicle runs forward as described above and the counterforce pressure at a given vehicle speed is decreased with increase in the steering angle. The steering angle at which the counterforce pressure begins to decrease at a given vehicle speed becomes larger as the vehicle speed increases and the rate at which the counterforce pressure decreases with the steering angle increases as the vehicle speed increases.

With this arrangement, when the vehicle runs rearward, the steering wheel becomes heavy at a lower speed than when the vehicle runs forward, whereby the position of the steering wheel is stabilized and occurrence of yaw is suppressed when the vehicle runs rearward, and at the same time when the driver consciously turns the steering wheel, that is, when the steering angle is larger than a predetermined value, the assisting force is increased and the driver can easily turn the steering wheel.

What is claimed is:

1. A power-steering system for a vehicle comprising a steering wheel which turns the front wheels, a power assisting means which assists the steering wheel in turning the front wheels, a vehicle speed sensor which detects the vehicle speed, and a control means which controls the power assisting means so that the assisting force with which the power assisting means assists the steering wheel is reduced with increase in the vehicle speed, characterized in that said control means has a reverse detecting means which detects when the vehicle runs rearward, and reduces the assisting force with increase in the vehicle speed at a higher rate when the vehicle runs rearward than when the vehicle runs forward.

2. A power-steering system for a vehicle as defined in claim 1 in which said control means is provided with a steering angle sensor which detects the angle by which the steering wheel is turned, and increases the assisting force at a given vehicle speed as the steering angle increases when the vehicle runs rearward.

3. A power-steering system for a vehicle as defined in claim 2 in which said control means decreases the assisting force at a given vehicle speed as the steering angle increases when the vehicle runs forward.

4. A power-steering system for a vehicle as defined in claim 2 in which the steering angle at which the assisting force begins to increase at a given vehicle speed becomes larger as the vehicle speed increases.

5. A power-steering system for a vehicle as defined in claim 5 in which the rate at which the assisting force increases with the steering angle increases as the vehicle speed increases.

6. A power-steering system for a vehicle as defined in claim 1 in which said power assisting means comprises a hydraulic cylinder system and a control valve means which controls restraining force on a torsion bar connected to the steering wheel, thereby controlling the assisting force.

7. A power-steering system for a vehicle as defined in claim 6 in which said control valve includes a counterforce mechanism comprising a counterforce chamber, a piston which is pressed against the torsion bar under the pressure in the counterforce chamber, and means for controlling the hydraulic pressure in the counterforce chamber.

* * * * *